United States Patent
Koga et al.

(10) Patent No.: US 9,675,964 B2
(45) Date of Patent: Jun. 13, 2017

(54) NOBLE METAL-OXIDE COMBINED NANOPARTICLE, AND, METHOD OF PRODUCING THE SAME WITH HIGH PURITY

(75) Inventors: Kenji Koga, Tsukuba (JP); Makoto Hirasawa, Tsukuba (JP); Hiroaki Sakurai, Osaka (JP); Naoto Koshizaki, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 833 days.

(21) Appl. No.: 13/983,436

(22) PCT Filed: Feb. 2, 2012

(86) PCT No.: PCT/JP2012/052329
§ 371 (c)(1),
(2), (4) Date: Oct. 21, 2013

(87) PCT Pub. No.: WO2012/105631
PCT Pub. Date: Aug. 9, 2012

(65) Prior Publication Data
US 2014/0038815 A1  Feb. 6, 2014

(30) Foreign Application Priority Data

Feb. 2, 2011 (JP) .................................. 2011-020993
Feb. 2, 2011 (JP) .................................. 2011-020996

(51) Int. Cl.
*B01J 23/00* (2006.01)
*B01J 23/89* (2006.01)
(Continued)

(52) U.S. Cl.
CPC ........... *B01J 23/8926* (2013.01); *B01J 23/42* (2013.01); *B01J 23/52* (2013.01); *B01J 23/56* (2013.01);
(Continued)

(58) Field of Classification Search
CPC ............ H04L 1/18; H04L 45/24; H04L 45/74
(Continued)

(56) References Cited

U.S. PATENT DOCUMENTS 7,288,134 B2   10/2007  Sun et al.
2006/0053971 A1  3/2006  Sun et al.
(Continued)

FOREIGN PATENT DOCUMENTS

JP    8-215570 A    8/1996
JP    8-215576 A    8/1996
(Continued)

OTHER PUBLICATIONS

Wang et al. "Preparation, characterization and catalytic behavior of SnO2 supported Au catalysts for low-temperature CO oxidation" Journal of Molecular Catalysis A: Chemical vol. 259, Issues 1-2, Nov. 15, 2006, pp. 245-252. Aug. 1, 2006.*
(Continued)

*Primary Examiner* — Colleen Dunn
*Assistant Examiner* — Haytham Soliman
(74) *Attorney, Agent, or Firm* — Birch, Stewart, Kolasch & Birch, LLP

(57) ABSTRACT

A method of producing a composite nanoparticle (M-$A_xO_y$), having: generating, in an inert gas, an alloy (A-M) nanoparticle, which contains 0.1 at. % to 30 at. % of a noble metal (M), with the balance being a base metal (A) and inevitable impurities, and which has a particle size of 1 nm to 100 nm, to heat the alloy (A-M) nanoparticle and to bring the alloy (A-M) nanoparticle into contact with a supplied oxidizing
(Continued)

gas during transportation of the alloy (A-M) nanoparticle with the inert gas, to oxidize the base metal component (A) in the floating alloy (A-M) nanoparticle, and to phase separate into the thus-oxidized base metal component ($A_xO_y$) and the noble metal component (M), to thereby obtain a composite nanoparticle (M-$A_xO_y$) having one noble metal particle (M) combined to the surface of a particulate base metal oxide ($A_xO_y$).

11 Claims, 5 Drawing Sheets

(51) Int. Cl.

| | | |
|---|---|---|
| B01J 23/56 | (2006.01) | |
| B01J 23/62 | (2006.01) | |
| B01J 23/63 | (2006.01) | |
| B01J 23/66 | (2006.01) | |
| B01J 35/00 | (2006.01) | |
| B01J 37/14 | (2006.01) | |
| B01J 37/34 | (2006.01) | |
| C01G 3/00 | (2006.01) | |
| C01G 7/00 | (2006.01) | |
| C01G 19/02 | (2006.01) | |
| C01G 55/00 | (2006.01) | |
| B82Y 30/00 | (2011.01) | |
| C22C 5/00 | (2006.01) | |
| C22C 5/02 | (2006.01) | |
| C22C 5/04 | (2006.01) | |
| B22F 1/00 | (2006.01) | |
| B22F 1/02 | (2006.01) | |
| B22F 9/12 | (2006.01) | |
| B22F 9/14 | (2006.01) | |
| B01J 23/42 | (2006.01) | |
| B01J 23/52 | (2006.01) | |
| C22C 1/02 | (2006.01) | |
| B82Y 40/00 | (2011.01) | |

(52) U.S. Cl.
CPC ............... *B01J 23/62* (2013.01); *B01J 23/63* (2013.01); *B01J 23/66* (2013.01); *B01J 35/0013* (2013.01); *B01J 37/14* (2013.01); *B01J 37/34* (2013.01); *B22F 1/0018* (2013.01); *B22F 1/02* (2013.01); *B22F 9/12* (2013.01); *B22F 9/14* (2013.01); *B82Y 30/00* (2013.01); *C01G 3/00* (2013.01); *C01G 7/00* (2013.01); *C01G 19/02* (2013.01); *C01G 55/00* (2013.01); *C22C 1/02* (2013.01); *C22C 5/00* (2013.01); *C22C 5/02* (2013.01); *C22C 5/04* (2013.01); *B22F 2999/00* (2013.01); *B82Y 40/00* (2013.01); *C01P 2002/84* (2013.01); *C01P 2004/03* (2013.01); *C01P 2004/62* (2013.01)

(58) Field of Classification Search
USPC ........................................................ 502/325
See application file for complete search history.

(56) References Cited

U.S. PATENT DOCUMENTS

| | | |
|---|---|---|
| 2008/0168863 A1 | 7/2008 | Sun et al. |
| 2008/0305022 A1 | 12/2008 | Kroll et al. |
| 2009/0092875 A1 | 4/2009 | Daimon et al. |

FOREIGN PATENT DOCUMENTS

| | | |
|---|---|---|
| JP | 8-283022 A | 10/1996 |
| JP | 8-283023 A | 10/1996 |
| JP | 10-80637 A | 3/1998 |
| JP | 2004-190089 A | 7/2004 |
| JP | 4170930 B2 | 10/2008 |
| JP | 2008-540126 A | 11/2008 |
| JP | 2009-94048 A | 4/2009 |

OTHER PUBLICATIONS

Bajaj, G. et al., "Synthesis of composite gold/tin-oxide nanoparticles by nano-soldering," Journal of Nanoparticle Research, vol. 12, No. 7, 2010, pp. 2597-2603.
Choi, S. et al., "Simple and Generalized Synthesis of Oxide-Metal Heterostructured Nanoparticles and their Applications in Multimodal Biomedical Probes," J. Am. Chem. Soc., vol. 130, No. 46, 2008, pp. 15573-15580.
International search report issued in PCT/JP2012/052329 mailed May 1, 2012.
Koga, K. et al., "Strain Analysis of $Au_xCu_{1-x}$-$Cu_2O$ Biphase Nanoparticles with Heteroepitaxial Interface," J. Phys. Chem. C, vol. 112, No. 6, 2008, pp. 2079-2085.
Wang, S. et al., "Nanostructure $SnO_2$ and supported Au catalysts: Synthesis, characterization, and catalytic oxidation of CO," Materials Letters, vol. 60, 2006, pp. 1706-1709.
Wang, X. et al., "Synthesis and Characterization of Water-Soluble and Bifunctional ZnO—Au Nanocomposites," J. Phys. Chem. C, vol. 111, No. 10, 2007, pp. 3836-3841.
Wu, B. et al., "Interfacial Activation of Catalytically Inert Au (6.7 nm)-$Fe_3O_4$ Dumbbell Nanoparticles for CO Oxidation," Nano Res., vol. 2, 2009, pp. 975-983.
Yin, H. et al., "Colloidal deposition synthesis of supported gold nanocatalysts based on Au—$Fe_3O_4$ dumbbell nanoparticles," Chem. Commun., 2008, pp. 4357-4359.
Yu, H. et al., "Dumbbell-like Bifunctional Au—$Fe_3O_4$ Nanoparticles," Nano Letters, vol. 5, No. 2, 2005, pp. 379-382.
Zhu, X. et al., "Characterization of Argon Glow Discharge Plasma Reduced Pt/$Al_2O_3$ Catalyst," Industrial & Engineering Chemistry Research, vol. 45, No. 25, 2006, pp. 8604-8609.

\* cited by examiner

NOBLE METAL-OXIDE COMBINED NANOPARTICLE, AND, METHOD OF PRODUCING THE SAME WITH HIGH PURITY

TECHNICAL FIELD

The present invention relates to nanoparticles made of combination between one noble metal nanoparticle and one oxide nanoparticle (or noble metal-oxide combined nanoparticles; hereinafter, the "combined nanoparticles" may also be referred to as "joined nanoparticles", "composite nanoparticles", "hybrid nanoparticles", or "Janus nanoparticles"), which can be expected to be applicable to catalysts and the like; and the present invention also relates to a method of forming the nanoparticles with high purity.

BACKGROUND ART

When materials with different properties are joined at an atomic level, new characteristics can be obtained, which may never be obtained with each of the materials alone. For example, combination of a p-type semiconductor and an n-type semiconductor brings about properties, such as the rectification performance, the photovoltaic effect, and the electroluminescence, and is therefore widely used in devices, such as diodes and transistors. In addition, heterostructures of magnetic thin films exhibit the tunneling magnetoresistance effect, the giant magnetoresistance effect, and the like, and hence heterojunction occupies a very important position as one of the means for controlling of physical properties.

In recent years, applications of unique properties developed by reducing the material dimensions to nanometer scale has been in very remarkable progress, and importance of heterojunction is pointed out also in the field of nanomaterials. Gold has been considered to be the most inert metal, but it has been revealed that nanometer-sized gold particles supported on an oxide, such as titanium oxide or cerium oxide, show industrially important catalytic reactions, such as the oxidation of CO, the water gas shift reaction, and the selective oxidation of, for example, propylene. From recent studies on the mechanism of the catalytic activities, it has been pointed out that the state of heterojunction between gold nanoparticles and the oxide is indispensable. Regarding methods of forming gold nanoparticle catalysts, generally use is made of a co-precipitation method, a deposition-precipitation method, and the like. In these methods, gold is precipitated on submicrometer-sized oxide powder crystals that have been prepared in advance, and by firing the resultant gold-precipitated crystals at high temperatures, strong bonding between the gold nanoparticles and the oxide powder crystal surfaces is formed.

For example, Non-Patent Literatures (1) to (5) and Patent Literatures (1) to (4) describe gold-oxide composite nanoparticles obtained by liquid phase synthesis, and Patent Literature (5) describes composite nanoparticles of a noble metal and a sulfide.

Specifically, Patent Literature (3) describes production of dumbbell-shaped or flower-shaped nanoparticles, having the first part formed from any one of PbS, CdSe, CdS, ZnS, Au, Ag, Pd and Pt, and the second part formed from any one of Au, Ag, Pd, Pt, Fe, Co and Ni, based on a mixture of nanoparticles containing a hydrophobic outer coating, and a precursor thereof, which can be applied to biomedicals, nanodevices, and the like. However, in respect to the combination between noble metals and oxides, $Au-Fe_2O_3$ and $Ag-Fe_3O_4$ are only described in examples of Patent Literature (3).

Patent Literature (4) describes the following combined nanoparticles applicable for composite catalysts for use in oxygen electrodes for fuel cells. One is the dumbbell-shaped composite nanoparticles in which one noble metal nanoparticle (having an average particle size of less than 10 nm) is epitaxially joined to one ferrite particle (having an average particle size of 5 nm to 50 nm), and the other is the flower-shaped composite nanoparticles in which two or more noble metal nanoparticles are epitaxially joined to one ferrite particle. Those combined nanoparticles are produced by steps of: heating a mixed solution of a surfactant and an organic solvent, to which a metal oxide precursor and noble metal nanoparticles are contained, into reflux; and precipitating target composite nanoparticles. The ferrite particles contain at least a ferrite of chemical formula: $A^{2+}B^{3+}{}_2O_4$ (wherein $A^{2+}$ represents an ion selected from the group consisting of $Mn^{2+}$, $Fe^{2+}$, $Co^{2+}$, $Ni^{2+}$, $Cu^{2+}$, $Mg^{2+}$, $Zn^{2+}$ and $Cd^{2+}$; and $B^{3+}$ represents an ion selected from the group consisting of $Fe^{3+}$, $Cr^{3+}$ and $Mn^{3+}$). The noble metal nanoparticles contain at least one element selected from the group consisting of at least Pt, Pd and Ag. However, only $Pt-Fe_3O_4$ is described in examples of Patent Literature (4).

Patent Literature (5) describes acorn-shaped binary metal nanoparticles that are anisotropically phase-separated, which are produced by reducing two types of metal salts in polyol at a high temperature, in the presence of a thiol compound, and in which one of the metals is Fe, Co, Ni or Cu, while the other metal is Pd, Pt, Au or Ag. Patent Literature (5) describes that the binary metal nanoparticles are expected to be applied in the fields of magnetic chemistry and catalytic chemistry. However, only binary nanoparticles formed from a sulfide of Co and a sulfide of Pd are described in examples of Patent Literature (5), and no descriptions are found on nanoparticles containing pure noble metal regions, nanoparticles containing base metal oxides, or methods for the production thereof.

Non-Patent Literatures (1) to (5) describe dumbbell-shaped nanoparticles of $Au-Fe_3O_4$, $Au-ZnO$ and $Au-MnO$ produced by liquid phase synthesis; however, no descriptions are found on using base elements other than Fe, Zn and Mn.

Furthermore, in Patent Literatures (1) to (4) and Non-Patent Literatures (1) to (3), only the use or a possibility of use of Fe, Co, Ni, Mn, Cu, Mg, Zn, Cd and Cr as the elements of the oxide is described, and no description is given on the use of Sn, Ti, Al, Zr, Ce, Y, La, Si and Ge. Furthermore, even in regard to the elements of the oxide for which a possibility of use is mentioned, no disclosure is found on compounds to be used in the case where those elements are employed. Therefore, it cannot be said that any inventions utilizing those metals are described to the extent that those having ordinary skill in the art can easily carry out such inventions. Furthermore, since such gold-oxide composite nanoparticles formed by liquid phase synthesis essentially contain various impurities, such as ions and organic materials, in the case of using the composite nanoparticles as a catalyst or the like, it is indispensable to carry out washing of poisoning ions, or removal by firing or cleaning of nanoparticle-protecting organic materials. Furthermore, it is not guaranteed that these cleaning steps can be always carried out stably and completely at an atomic level, with good reproducibility. Also, even from the viewpoint that hazardous materials, such as metal carbonyls, are used as raw materials, or from the viewpoint that various elements for the oxides other than those used as described above cannot be selected in a simple manner, there are many problems to be solved in the formation of gold-oxide composite nanoparticles by the liquid phase synthesis.

Patent Literatures (6) to (10) propose methods for forming plural noble metal nanoparticles on the surface of base metal oxide particles, by forming noble metal-base metal nanoparticles (alloy nanoparticles) in an inert gas using an arc melting method, and then, subjecting the nanoparticles to an oxidation treatment. The temperature and time period for the oxidation treatment are defined to be a gradual oxidation treatment at room temperature, or set to 2 minutes to 4 hours at 200° C. to 600° C., or the like. However, in these methods, the alloy nanoparticles have already aggregated, and thus the materials obtainable are in the form that noble metals are precipitated irregularly and non-uniformly on base metal oxide aggregates. Therefore, by those methods, composite nanoparticles, in which one noble metal nanoparticle is combined to the surface of one base metal oxide nanoparticle, cannot be obtained in an independently dispersed state.

Furthermore, in Patent Literatures (6) to (8), formation of noble metal-oxide composite nanoparticles is also carried out, by evaporating a raw material alloy in an inert gas containing oxygen. In those methods, among the noble metal atoms and base metal atoms that have evaporated by heating of the raw material alloy, only the base metal atoms are brought into reaction with oxygen, and associates of base metal atoms and oxygen are formed beforehand. Then, many of the noble metal atoms and the associates of base metal atoms and oxygen coalesce in a gas phase, thereby to grow noble metal-base metal oxide composite nanoparticles. It is reported that the particles formed via such a growing are in the form in which plural noble metal nanoparticles adhere onto one base metal oxide particle. Therefore, according to those methods, composite nanoparticles in which one noble metal nanoparticle is combined to the surface of one base metal oxide nanoparticle cannot be obtained in an independently dispersed state.

Patent Literature (9) describes a method of producing composite ultrafine particles, including, for example: heating and melting raw materials of T·M (wherein T represents Ti, Al or the like; and M represents Au, Pd or the like) in an atmosphere containing at least one gas selected from the group consisting of hydrogen gas, nitrogen gas and inert gases, to form ultrafine particles; collecting the ultrafine particles with a filter; and then heating the collected ultrafine particles in an atmosphere containing oxygen. In this production method, the ultrafine particles collected with a filter are subjected to an oxidative heat treatment in a state in which the ultrafine particles are joined or aggregated with each other, but the ultrafine particles are not subjected to the oxidative heat treatment during floating and in an independently dispersed state. For that reason, this method can only give particulate composite materials, in which a large number of fine particles formed from noble metals, such as Au and Pd, or/and compounds thereof, are precipitated and dispersed on ultrafine particles formed from metal oxides of Ti, Al and the like. Therefore, by this production method, composite nanoparticles in which one noble metal nanoparticle is combined to the surface of one base metal oxide nanoparticle, cannot be obtained in an independently dispersed state.

In contrast, the inventors of the present invention produced, as previously reported in Non-Patent Literature (6), composite nanoparticles composed of a metal region and a copper oxide region, by forming Cu-46 at. % Au alloy nanoparticles in helium gas by the same process as the inert gas evaporation method as described in Examples of the present invention, and then carrying out a high temperature oxidation treatment in a gas phase. However, since the content of Au in the alloy nanoparticles is too high, the alloy nanoparticles cannot be completely oxidized, and the metal region of the composite nanoparticles is in the state of an Au-17 at. % Cu alloy, so that the complete separation of Au was not possible to be realized.

CITATION LIST

Patent Literatures

Patent Literature 1: U.S. Pat. No. 7,288,134
Patent Literature 2: US 2006/0053971
Patent Literature 3: US 2008/0168863
Patent Literature 4: JP-A-2009-94048
Patent Literature 5: JP Patent No. 4170930
Patent Literature 6: JP-A-8-215570
Patent Literature 7: JP-A-8-215576
Patent Literature 8: JP-A-8-283022
Patent Literature 9: JP-A-8-283023
Patent Literature 10: JP-A-10-80637

Non-Patent Literatures

Non-Patent Literature 1: H. Yu et al., Nano Lett., 5, 2005, 379-382.
Non-Patent Literature 2: H. Yin et al., Chem. Commun., 2008, 4357-4359.
Non-Patent Literature 3: B. Wu et al., Nano Res., 2, 2009, 975-983.
Non-Patent Literature 4: X. Wang et al., J. Phys. Chem. C, 111, 2007, 3836-3841.
Non-Patent Literature 5: S.-H. Choi et al., J. Am. Chem. Soc., 130, 2008, 15573-15580.
Non-Patent Literature 6: K. Koga and D. Zubia, J. Phys. Chem. C, 112, 2008, 2079-2085.

SUMMARY OF INVENTION

Technical Problem

In the catalyst formation methods, such as the co-precipitation method or the deposition-precipitation method, there is an advantage that a noble metal-supported oxide catalyst can be readily obtained. However, there are problems such as coarsening of gold particles during the high temperature firing process to produce heterojunction between noble metals/oxides, and remaining of poisoning substances, such as chloride ions. Furthermore, since the heterointerface between the gold nanoparticles and the oxide is generally formed at various atomic surfaces, it is impossible to uniformly control the heterointerface for each of the nanoparticles. In order to achieve stable supply of the heterointerfaces showing characteristic physical properties, such as catalysis, etc., it is important to form the heterointerface uniformly with good reproducibility, and it is desirable to establish noble metal-oxide combined nanoparticles from which stable heterointerfacial properties can be expected, and to establish a clean fabrication method of the noble metal-oxide combined nanoparticles, by which poisoning substances are avoidable.

The present invention is contemplated for providing novel composite nanoparticles, each of which has one noble metal nanoparticle of high purity combined with one oxide nanoparticle, which have no poisoning substance remaining therein, and which are expected to exhibit various unique physical and chemical properties and functions, such as chemical reactivity, electronic, magnetic and optical properties and functions, originating from heterointerfaces between two nanometer-scale phases having totally different properties, and for providing a method of producing the combined nanoparticles.

Solution to Problem

The present invention is based on the findings that, when nanoparticles of an alloy between a noble metal, such as gold or platinum, and a base metal that is readily oxidized at a high temperature, are subjected to a thermal oxidation treatment at a high temperature in a state that the nanoparticles are floating in a gas phase, composite nanoparticles (M-$A_xO_y$) each having one high-purity noble metal particle (M) combined to the surface of a particular base metal oxide ($A_xO_y$), which were impossible to obtain in conventional liquid phase synthesis methods, can be continuously formed in one-step, and furthermore, there is no risk of inevitable incorporation of impurities during the formation process. Thus, the present invention has the following features.

(1) A method of producing a composite nanoparticle (M-$A_xO_y$), having: generating, in an inert gas, an alloy (A-M) nanoparticle, which contains 0.1 at. % to 30 at. % of a noble metal (M), with the balance being a base metal (A) and inevitable impurities, and which has a particle size of 1 nm to 100 nm, to heat the alloy (A-M) nanoparticle and to bring the alloy (A-M) nanoparticle into contact with a supplied oxidizing gas during transportation of the alloy (A-M) nanoparticle with the inert gas, to oxidize the base metal component (A) in the floating alloy (A-M) nanoparticle, and to phase separate into the thus-oxidized base metal component ($A_xO_y$) and the noble metal component (M), to thereby obtain a composite nanoparticle (M-$A_xO_y$) having one noble metal particle (M) combined to the surface of a particulate base metal oxide ($A_xO_y$).

(2) The method of producing a composite nanoparticle (M-$A_xO_y$) as described in the above item (1), wherein the composite nanoparticle (M-$A_xO_y$) is obtained in an independently dispersed state.

(3) The method of producing a composite nanoparticle (M-$A_xO_y$) as described in the above item (1) or (2), wherein the thermal oxidation treatment of the alloy (A-M) nanoparticle is carried out in a gas phase, at a temperature of 400° C. or higher, for a treatment time period of 10 seconds or less.

(4) The method of producing a composite nanoparticle (M-$A_xO_y$) as described in any one of the above items (1) to (3), wherein the oxidizing gas is supplied before the heating of the alloy (A-M) nanoparticle, thereby heating it with a mixed gas of the oxidizing gas and the inert gas, or the oxidizing gas is supplied during the heating of the alloy (A-M) nanoparticle in the inert gas.

(5) The method of producing a composite nanoparticle (M-$A_xO_y$) as described in any one of the above items (1) to (4), wherein the generation of the alloy (A-M) nanoparticle is conducted by any one of an inert gas evaporation method, a laser ablation method, a sputtering method, an arc plasma method, and an atmospheric pressure plasma method.

(6) The method of producing a composite nanoparticle (M-$A_xO_y$) as described in any one of the above items (1) to (5), wherein the base metal (A) of the base metal oxide ($A_xO_y$) component is one or more selected from Cu, Sn, Ti, V, Cr, Mn, Co, Fe, Ni, Zn, Al, Y, Zr, Mo, In, Mg, La, Ce, Nd, Sm, Eu, Gd, Si, Ge, Pb and Bi; and wherein the noble metal (M) is one or more selected from Au, Pt, Pd, Rh, Ag, Ru and Ir.

(7) A method of producing a composite nanoparticle (M-$A_xO_y$), having: generating, in an inert gas, an alloy (A-M) nanoparticle, which contains 0.1 at. % to 30 at. % of a noble metal (M), with the balance being a base metal (A) and inevitable impurities, and which has a particle size of 1 nm to 200 nm, to heat the alloy (A-M) nanoparticle and to bring the alloy (A-M) nanoparticle into contact with a supplied oxidizing gas during transportation of the alloy (A-M) nanoparticle with the inert gas, to oxidize the base metal component (A) in the floating alloy (A-M) nanoparticle, and to phase separate into the thus-oxidized base metal component ($A_xO_y$) and the noble metal component (M), to thereby obtain a composite nanoparticle (M-$A_xO_y$) composed of a region of one particulate base metal oxide ($A_xO_y$) and a region of one particulate noble metal (M), wherein the base metal (A) is one or more selected from Cu, Sn, Al, Ni, Co, Ti, Zr, In, Si, La, Ce and Eu, and wherein the noble metal (M) is one or more selected from Au, Pt, Pd, Rh and Ag.

(8) A composite nanoparticle (M-$A_xO_y$), having one noble metal particle (M) with a particle size of 1 nm to 10 nm combined to the surface of a base metal oxide ($A_xO_y$) with a particle size of 1 nm to 100 nm, wherein a base metal (A) of the base metal oxide ($A_xO_y$) component is one or more selected from Cu, Sn, Ti, V, Cr, Mn, Co, Ni, Zn, Al, Y, Zr, Mo, In, Mg, La, Ce, Nd, Sm, Eu, Gd, Si, Ge, Pb and Bi (provided that the case where the base metal oxide is ZnO or MnO is excluded), and wherein the noble metal (M) is one or more selected from Au, Pt, Pd, Rh, Ag, Ru and Ir.

(9) The composite nanoparticle (M-$A_xO_y$) as described in the above item (8), wherein the composite nanoparticle (M-$A_xO_y$) is Au—$Cu_2O$ or Au—$SnO_2$.

(10) A composite nanoparticle (M-$A_xO_y$), having a region of one base metal oxide ($A_xO_y$) with a size of 1 nm to 200 nm and a region of one noble metal (M) with a size of 1 nm to 100 nm, wherein a base metal (A) of the base metal oxide ($A_xO_y$) component is one or more selected from Cu, Sn, Al, Ni, Co, Ti, Zr, In, Si, La, Ce and Eu, and wherein the noble metal (M) is one or more selected from Au, Pt, Pd, Rh and Ag.

(11) The composite nanoparticle (M-$A_xO_y$) as described in the above item (10), wherein the base metal (A) of the base metal oxide ($A_xO_y$) component is one or more selected from Cu, Sn and Al, and wherein the noble metal (M) is one or more selected from Au and Pt.

Advantageous Effects of Invention

The production method of the present invention has a remarkable advantage that nanoparticles, in which nanoparticles of noble metals represented by gold are heterojoined onto various oxide nanoparticles, can be readily and conveniently fabricated in a gas phase. The product is obtained in very high purity, and there is no chance of incorporation of impurities, such as chlorine or chloride ions and organic substances. Therefore, the steps that are essential in Non-Patent Literatures (1) to (3) or Patent Literatures (1) to (4) for washing or removing these impurities are not at all necessary. The advantage that these post-steps (post-treatments) are unnecessary, is very important particularly for good stability in catalyst formation processes.

In the production method of the present invention, alloy nanoparticles independently dispersed in a gas phase are oxidized at high temperatures in a gas phase, leading to nanoparticles, in which only one noble metal nanoparticle is combined to only one oxide nanoparticle via one interfacial plane. The thus-formed combined nanoparticles obtainable by the present invention cannot be obtained in Patent Literatures (6) to (10).

In the production method of the present invention, unlike Non-Patent Literature (6), by adjusting the content of the noble metal in the alloy nanoparticles not to be excessively high, alloy nanoparticles can be completely oxidized, to generate a metallic part composed of only the noble metal by phase separation.

Furthermore, the noble metal-oxide combined nanoparticles (M-$A_xO_y$) of the present invention are ultrafine particles each having one high-purity noble metal particle (M) with a particle size of 1 nm to 100 nm (preferably, 1 nm to 10 nm) atomically joined to the surface of a base metal oxide particle ($A_xO_y$) with a particle size of 1 nm to 200 nm (preferably, 1 nm to 100 nm). The noble metal-oxide combined nanoparticles are expected to exhibit various unique physical or chemical properties and functions, such as chemical reactivities, electronic, magnetic, and optical properties, originating from a heterointerface between two nanoscale phases having totally different properties. The noble metal-oxide combined nanoparticles (M-$A_xO_y$) of the present invention are effective when, for example, used as oxidizing catalysts, but a quite wide variety of industrial applications thereof can be expected, by appropriately selecting the noble metal and the oxide.

MODE FOR CARRYING OUT THE INVENTION

Hereafter, some modes for carrying out the present invention are described.

Figure 1:
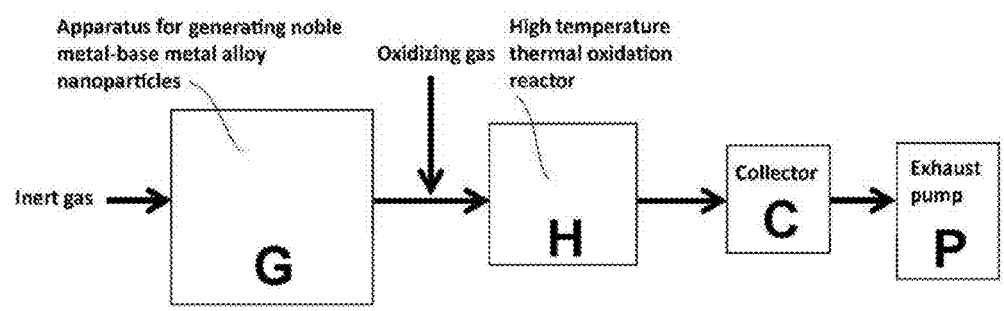
FIG. 1 is a diagram illustrating a production process for the noble metal-oxide combined nanoparticles of the present invention (FIG. 1 is illustrated such that an oxidizing gas is supplied between G and H, but instead, the oxidizing gas may also be supplied in any arbitrary internal position in H).

An example of the method of producing composite nanoparticles of the present invention is illustrated in FIG. 1. The method of producing composite nanoparticles of the present invention includes a step, for example, of: generating, in an inert gas, alloy (A-M) nanoparticles, which contain 0.1 at. % to 30 at. % of a noble metal (M), with the balance being a base metal (A) and inevitable impurities, and which have a particle size of 1 nm to 200 nm (preferably, 1 nm to 100 nm), to heat the alloy (A-M) nanoparticles and to bring the alloy nanoparticles into contact with a supplied oxidizing gas during transportation of the alloy nanoparticles with the inert gas, to thereby oxidize the base metal component (A) in the floating alloy (A-M) nanoparticles, and to phase separate the alloy nanoparticles into the oxidized base metal component ($A_xO_y$) and the noble metal component (M).

In this production method, it is not necessary to use noble metals and base metals in the form of soluble compounds [for example, $HAuCl_4$, $H_2PtCl_6$, and $Fe(CO)_5$], and use can be made of any of noble metals and base metals as long as they are capable of generating alloy (A-M) nanoparticles in an inert gas. Thus, a wide variety of noble metals and base metals other than Au, Pt, Cu, Sn, and Al used in the Examples described below can be employed, since the present invention is free from limitations to the types of noble metal and base metal elements which are, for example, caused by the restrictions on compounds in the case of liquid phase synthesis.

The production apparatus for the composite nanoparticles, which is used to carry out this production method, is constituted of connection in series of: an apparatus for generating noble metal-base metal alloy nanoparticles as a raw material (G; hereinafter, also referred to as "alloy nanoparticle generation apparatus"), a high temperature thermal oxidation reactor (H), a collector (C), and an exhaust pump (P). The exhaust pump (P) is employed; to exhaust the inert gas supplied into the alloy nanoparticle generation apparatus (G), and the oxidizing gas supplied into an intermediate position between the alloy nanoparticle generation apparatus (G) and the high temperature thermal oxidation reactor (H) or into a high temperature zone in the high temperature thermal oxidation reactor; and to control the pressure conditions of the alloy nanoparticle generation apparatus (G).

There are no limitations on the base metal A that constitutes the raw material, and the base metal may be one or more selected from, for example, Cu, Sn, Ti, V, Cr, Mn, Co, Fe, Ni, Zn, Al, Y, Zr, Mo, In, Mg, La, Ce, Nd, Sm, Eu, Gd, Si, Ge, Pb, and Bi. Preferably, the base metal A may be one or more selected from Cu, Sn, Al, Ni, Co, Ti, Zr, In, Si, La, Ce, and Eu.

There are no limitations on the noble metal M that constitutes the raw material, and the noble metal may be one or more selected from, for example, Au, Pt, Pd, Rh, Ag, Ru, and Ir. Preferably, the noble metal M may be one or more selected from Au, Pt, Pd, Rh, and Ag.

Based on the reason described below, the base metal A-noble metal M alloy of the raw material is preferably such that the content of the noble metal M in the A-M alloy nanoparticles is about 0.1 at. % to 30 at. % (more preferably, 1 at. % to 15 at. %, and even more preferably, 2 at. % to 10 at. %), and the content of the noble metal M is preferably determined, in consideration of the vapor pressures of the base metal A and the noble metal M, and the like. In the inert gas evaporation method, the noble metal content of the base metal A-noble metal M alloy of the raw material may vary depending on the type of the base metallic element, but, for example, the noble metal content can be set to a range of 1 at. % to 60 at. %. When the base metal element is Cu or Sn, it is appropriate to set the noble metal content to 30 at. % to 60 at. % (preferably, 35 at. % to 55 at. %, and more preferably 40 at. % to 50 at. %). In the laser ablation method, since composition of the raw material alloy and composition of the alloy nanoparticles produced becomes almost identical, the noble metal content in the base metal A-noble metal M alloy of the raw material may be set to about 0.1 at. % to 30 at. % (more preferably 1 at. % to 15 at. %, and even more preferably 2 at. % to 10 at. %).

For the gas phase generation of the A-M alloy nanoparticles of the base metal A and the noble metal M that served as raw materials, use can be made of the generation apparatus operable under a pressure range from a low pressure (for example, about 0.1 kPa to 10 kPa) up to about the atmospheric pressure (101.3 kPa). For example, use can be made of an inert gas evaporation method, a laser ablation method, a sputtering method, an arc plasma method, and an atmospheric pressure plasma method, and in addition to these, various methods for generating nanoparticles in a gas phase can be appropriately used. An inert gas, such as helium, argon and nitrogen, is used, to generate noble metal-base metal alloy nanoparticles having a size of about 1 nm to 200 nm (preferably 1 nm to 100 nm, more preferably 2 nm to 80 nm, and even more preferably 5 nm to 60 nm). The particle size of the alloy nanoparticles generally increases as the temperature of the evaporation source (i.e. the energy input to the evaporation source) is higher, or as the pressure of the inert gas is higher and the flow rate is slower. Thus, the particle size can be appropriately controlled while the experiment results are checked.

In the case that secondary nanoparticles are formed by aggregation of primary nanoparticles on the production of noble metal-base metal alloy nanoparticles, the secondary nanoparticles are heated and sintered into isolatedly dispersed particles in an inert atmosphere by means of, for example, a preheating mechanism or the like, before being transferred into the high temperature thermal oxidation reactor (H) for the thermal oxidation treatment.

The thus-formed alloy nanoparticles are mixed with the oxidizing gas during transporting with the inert gas stream, where the oxidizing gas is provided at a position upstream to or at a position inside the high temperature thermal oxidation reactor. As the oxidizing gas, use can be made, for example, of oxygen gas alone, or a mixture of air or oxygen gas and an inert gas. In the case of supplying the oxidizing gas at a position upstream to the high temperature thermal oxidation reactor, the alloy nanoparticles are caused to flow into the high temperature thermal oxidation reactor, being partially oxidized together with a mixed gas of the inert gas and the oxidizing gas. Thus, only the base metal element constituting the alloy nanoparticles is completely oxidized by the oxygen gas in the mixed gas heated to a high temperature. On the other hand, in the case of supplying the oxidizing gas at a position inside the high temperature thermal oxidation reactor, the alloy nanoparticles are caused to flow into the high temperature thermal oxidation reactor together with the inert gas, to be exposed to oxygen at a high temperature, where the nanoparticles just before oxidation is in a state of being heated to a high temperature (a high temperature solid or a molten state). Thus, only the base metal element is rapidly oxidized completely. The velocity of oxidation and the extent of evaporation of the base metal and the noble metal, which is caused by heat of oxidation, depend on the supplying position of the oxidizing gas. However, in any cases, the noble metal and the base metal oxide undergo nano-scale phase separation during the heating, to generate composite nanoparticles ($M-A_xO_y$) each having one noble metal particle (M) combined to the surface of the base metal oxide particle ($A_xO_y$). On the phase separation, a uniform heterointerface is occasionally created in individual particles, by a simultaneous heat treatment at high temperatures.

The alloy nanoparticles in the high temperature thermal oxidation reactor can be indirectly heated with the mixed gas heated to a high temperature, using, for example, a tubular electric furnace equipped with a quartz tube as a furnace core tube, or alternatively the nanoparticles can be directly heated, using induction heating, microwave heating, or the like.

The high temperature thermal oxidation treatment may vary depending on types of the noble metal and the base metal, but in general, the high temperature thermal oxidation treatment can be carried out at a temperature of 400° C. or higher (preferably 500° C. to 1,200° C., and more preferably 600° C. to 1,100° C.) for a treatment time period of 10 seconds or less. When the treatment temperature is raised, the treatment time period can be shortened. In the high temperature thermal oxidation reactor, the heating zone is configured along the transportation path of the alloy nanoparticles as the alloy nanoparticles can be heated during such a treatment time period.

The noble metal-base metal oxide composite nanoparticles flowed out from the high temperature thermal oxidation reactor are cooled down to around ambient temperature by natural cooling or by use of an appropriate cooler, followed by collecting them inside the collector. Regarding the collecting method, use can be appropriately made of any of dry methods and wet methods that are used in aerosol collection techniques.

In the process described above, in order to separate the noble metal M phase completely by thermal oxidation of the A-M alloy nanoparticles in a gas phase, the composition of the noble metal M is about 0.1 at. % to 30 at. % (more preferably, 1 at. % to 15 at. %, and even more preferably 2 at. % to 10 at. %), and the oxygen concentration in the mixed gas is preferably 10% or more.

Furthermore, in the applications, such as electronic devices and catalysts, high-purity production of the composite nanoparticles is very important, therefore it is desirable that the A-M alloy nanoparticles have impurities as small contents as possible. However, the A-M alloy nanoparticles may contain the impurities that originate from impurities in the noble metal or base metal of the raw material or the like. It is desirable to select the raw material such that the content of the impurities is in the range to the extent that the intended functions are not significantly impaired (for example, less than 0.01 at. %, preferably less than 0.001 at. %).

The noble metal-base metal oxide composite nanoparticles ($M-A_xO_y$) of the present invention are continuously and very cleanly produced via the process step as described above, and made of one noble metal particle (M) of size 1 nm to 100 nm (preferably 1 nm to 10 nm) combined to the surface of the base metal oxide particle ($A_xO_y$) of size 1 nm to 200 nm (preferably 1 nm to 100 nm), in which the base metal (A) of the base metal oxide ($A_xO_y$) component is one or more selected from Cu, Sn, Ti, V, Cr, Mn, Co, Ni, Zn, Al, Y, Zr, Mo, In, Mg, La, Ce, Nd, Sm, Eu, Gd, Si, Ge, Pb and Bi (provided that the case where the base metal oxide is ZnO or MnO is excluded), and in which the noble metal (M) is one or more selected from Au, Pt, Pd, Rh, Ag, Ru and Ir. The composite nanoparticles can be defined also to be composed of one region of the base metal oxide ($A_xO_y$) having a size of 1 nm to 200 nm, and one region of the noble metal (M) having a size of 1 nm to 100 nm.

The particle size of the base metal oxide is 1 nm to 200 nm, preferably 1 nm to 100 nm, more preferably 2 nm to 50 nm, and even more preferably 5 nm to 30 nm. The particle size of the noble metal particles is 1 nm to 100 nm, preferably 1 nm to 10 nm, more preferably 1 nm to 8 nm, and even more preferably 1 nm to 5 nm. The particle size of the base metal oxide depends not only on that of the noble metal-base metal alloy nanoparticles before oxidation, but also on evaporation of the base metal caused by the heat of oxidation in the high temperature thermal oxidation treatment. Thus, in use of a base metal having high evaporability, the particle size of the base metal oxide can be controlled by adjusting the supplying position of the oxidizing gas as mentioned above.

In the present invention, the "particle size" is defined as the average value of largest and smallest diameters measured through the gravitational center of the particle image obtained by TEM (transmission electron microscope). The size of the region of the base metal oxide or noble metal is defined as the average value of largest and smallest diameters measured through the gravitational center of the TEM image of the base metal oxide region or the noble metal region, respectively, where each region can be regarded as particle.

The base metal oxide ($A_xO_y$) in the composite nanoparticles (M-$A_xO_y$) produced by the present invention may be an oxide of a single base metal element having the same valency [in that case, x and y in the formula of $A_xO_y$ each represent a positive integer, and x and y satisfy the formula: xn=2y (wherein n represents the valency of the base metal atom A)]. Alternatively, the base metal oxide may be an oxide of a single base metal element having a different valency (mixed valence oxide), or a composite oxide of plural kinds of base metal elements [in that case, the following relationships are satisfied: $A_x=A_1x_1 \ldots A_ix_i$; $x=\Sigma x_i$; $\Sigma x_i \times n_i=2y$ (wherein $A_i$ represents the elemental component of the same base metal with different valences, or different base metals; $x_i$ represents the mole number of $A_i$; and $n_i$ represents the valency of $A_i$)]. Furthermore, alternatively, the base metal oxide may also be a mixture of plural kinds of base metal oxides.

The noble metal (M) in the composite nanoparticles (M-$A_xO_y$) that are produced by the present invention may be a noble metal of one kind, or may be a mixture of plural kinds of noble metals. The purity of the noble metal (M) is brought to the extent of a noble metal raw material (generally about 99.99% to 99.999%) or higher (for example, 99.9999% or higher), through the processes of alloy nanoparticle generation and phase separation from the base metal oxide component ($A_xO_y$).

EXAMPLES

Hereafter, the present invention will be more specifically described by way of Examples, but the present invention is not intended to be limited by these Examples, and various adjustments in the setting or modifications in design can be made to the extent that the gist of the present invention is maintained.

Example 1

Formation of Au—$Cu_2O$ Composite Nanoparticles, and Measurement of CO Oxidation Catalytic Activity As a source for generating alloy nanoparticles, use was made of a generation apparatus according to an inert gas evaporation method. Helium was supplied at an inlet rate of 0.4 L/min into the apparatus, and the pressure inside the apparatus was maintained at a reduced pressure of 2 kPa using an oil rotary pump. A Cu-46 at. % Au ingot was placed in a crucible of pBN (pyrolytic boron nitride) coupled with a carbon crucible, followed by heating to 1,200° C. by high-frequency heating. The above experimental conditions enabled to generate Cu-4 at. % Au alloy nanoparticles, in helium gas, in which the Au content of the nanoparticles was decreased from that of the raw alloy ingot due to the higher vapor pressure of Cu than Au. The alloy nanoparticles thus generated were transported into a quartz tube heated to 1,100° C., together with helium gas and oxygen gas which was mixed at an inlet rate of 0.2 L/min, followed by subjecting to a high temperature oxidation treatment. The time period for the thermal oxidation treatment was about 0.1 seconds. The Au—$Cu_2O$ composite nanoparticles formed after the oxidation treatment were deposited sparsely on an amorphous carbon film settled inside the collector, to obtain a sample for electron microscopy observations. Another sample for catalytic activity measurements was obtained by collecting together with a silica nanopowder (Sigma-Aldrich, 637238) as buffer particles.

Figure 2:
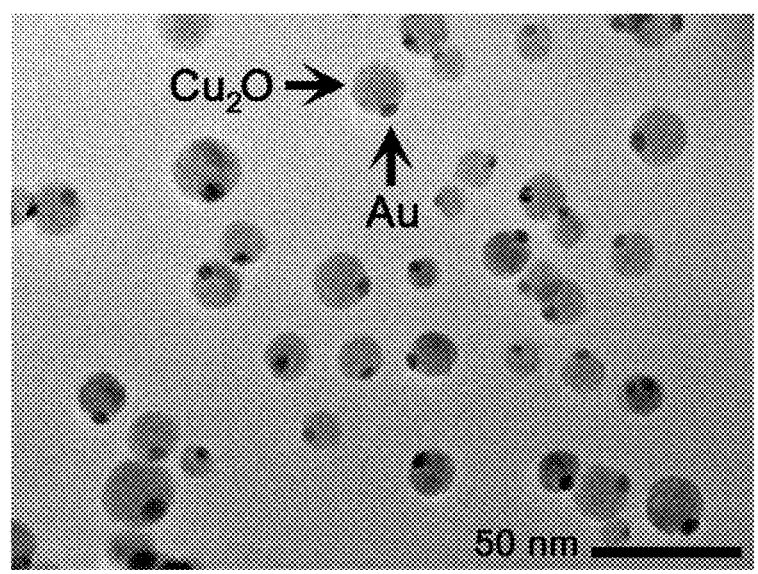
FIG. 2 is a TEM micrograph of a sample in which Au—$Cu_2O$ composite nanoparticles are sparsely deposited onto an amorphous carbon film.
Figure 3:
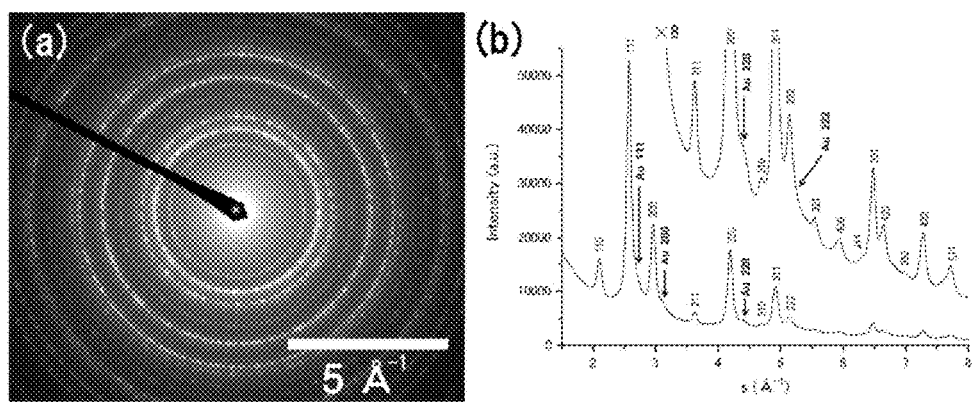
FIG. 3(a) is an electron diffraction pattern of the sample in which the Au—$Cu_2O$ composite nanoparticles are sparsely deposited onto the amorphous carbon film.
FIG. 3(b) is a diagram illustrating the electron diffraction pattern of FIG. 3(a) converted into an intensity distribution as a function of the wave vector s.

FIG. 2 shows a TEM micrograph of the Au—$Cu_2O$ composite nanoparticles having an average particle size of 9.8±4.6 nm. It can be seen that a very small region with dark contrast is present partially in each of the particles. FIG. 3(a) is an electron diffraction pattern image of the same sample, and FIG. 3(b) is an intensity distribution obtained by converting the electron diffraction pattern as a function of the wave vector s. All of the clear peaks shown in FIG. 3(b) were due to diffraction by $Cu_2O$ crystal planes. Among these, very weak peaks originating from Au (shown with arrows) were confirmed. By a detailed analysis, the lattice constants of $Cu_2O$ and Au were determined to be 0.4271±0.0004 nm and 0.4070±0.0034 nm, respectively, and it was verified, within an error range, that the substances were $Cu_2O$ (literature value: 0.42696 nm) and Au (literature value: 0.4079 nm). It was thus confirmed that the very small region with high contrast in each of the particles in FIG. 2 was Au, while the other large region was $Cu_2O$. Furthermore, according to the results of an ICP (inductively coupled plasma) analysis, the molar composition ratio of Au:Cu of the composite nanoparticles was 5:95, which was almost the same as that ratio of the alloy nanoparticles before subjected to the oxidation.

FIG. 4(a) and FIG. 4(b) are high resolution TEM micrographs of 17-nm Au—$Cu_2O$ composite nanoparticles. Clear lattice images are observed in the $Cu_2O$ regions, and their crystallographic orientations were determined from lattice spacings and relative angle between lattice fringes to be <100> for FIG. 4(a) and <110> for FIG. 4(b). Clear lattice images are also observed in the Au region, and their crystallographic orientations were completely coherent with those of the $Cu_2O$ regions. Since the lattice fringes between the two phases are completely connected, the two phases are heteroepitaxially joined with each other. FIG. 4(c) and FIG. 4(d) are high resolution TEM micrographs of 14-nm and 7-nm Au—$Cu_2O$ composite nanoparticles, respectively. It can also be seen that the two phases in these particles are very well heterojoined. In the every cases, a half of the Au region is embedded in the $Cu_2O$ region. By changing the heat treatment temperature under the above experimental conditions, the phase separated structure was obtained at a temperature of 400° C. or higher, while such the structure could not be obtained at a temperature of 300° C. or lower.

Figure 4:
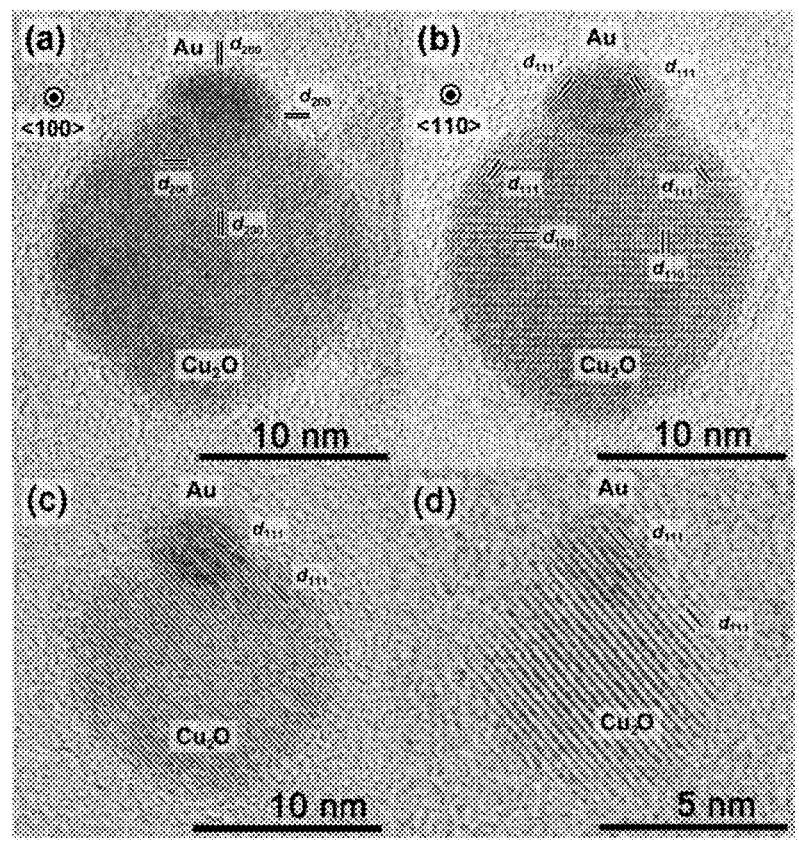
FIG. 4(a) and FIG. 4(b) are high resolution TEM micrographs of 17-nm Au—$Cu_2O$ composite nanoparticles observed along <100> and <110> orientations, respectively.
FIG. 4(c) and FIG. 4(d) are high resolution TEM micrographs of 14-nm and 7-nm Au—$Cu_2O$ composite nanoparticles, respectively.
Figure 5:
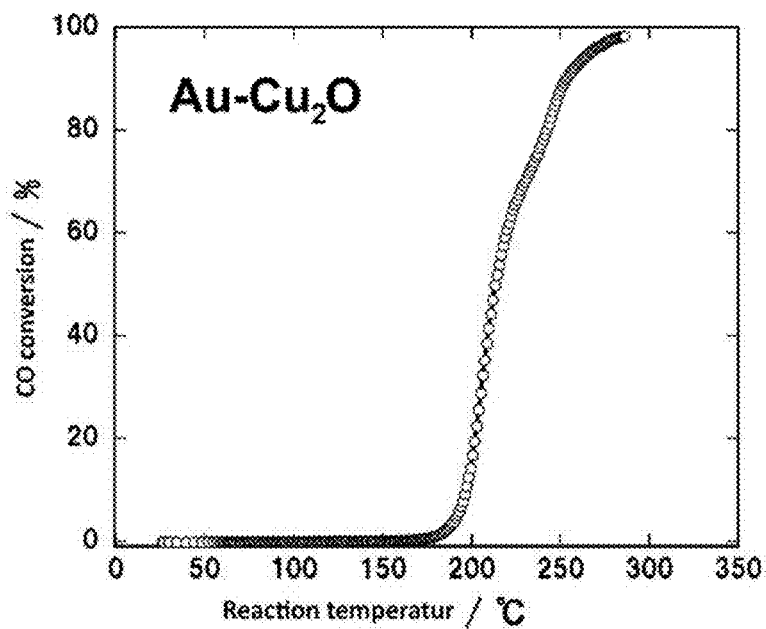
FIG. 5 is a diagram illustrating a catalytic activity (a temperature dependence of a conversion of CO to $CO_2$) of a sample containing Au—$Cu_2O$ composite nanoparticles.

A sample for measuring a catalytic activity was prepared by mixing the Au—$Cu_2O$ composite nanoparticles with a silica powder. The total amount of the silica powder and the Au—$Cu_2O$ composite nanoparticles used for the measurement was 81 mg, and the content of the Au—$Cu_2O$ composite nanoparticles was 0.65 wt. %. The catalytic activity for CO oxidation was measured, using a fixed bed flow reactor. A mixed gas of CO (1%)+$O_2$ (20%)+He was flowed at a flow rate of 0.1 L/min. The temperature was increased at a rate of 1° C./min. FIG. 5 shows the temperature dependence of the CO conversion to $CO_2$. The CO conversion rapidly increased above about 200° C., and the temperature for 50% conversion ($T_{50\%}$) was 215° C. The reaction rate per unit weight of the Au—$Cu_2O$ composite nanoparticles (excluding the silica powder) was calculated, and the result in an Arrhenius plot was compared with the activity of catalysts previously reported. It was revealed that the catalytic activity of the composite nanoparticles is comparable to that of, for example, alumina-supported gold catalysts prepared by a liquid phase method (deposition-precipitation method). This catalytic activity comes from condition of the strong bonding between Au and $Cu_2O$ forming a heterointerface, as shown in FIG. 4, which was generated by subjecting individual particles to a high temperature heat treatment in the process of the present invention.

Example 2

Figure 6:
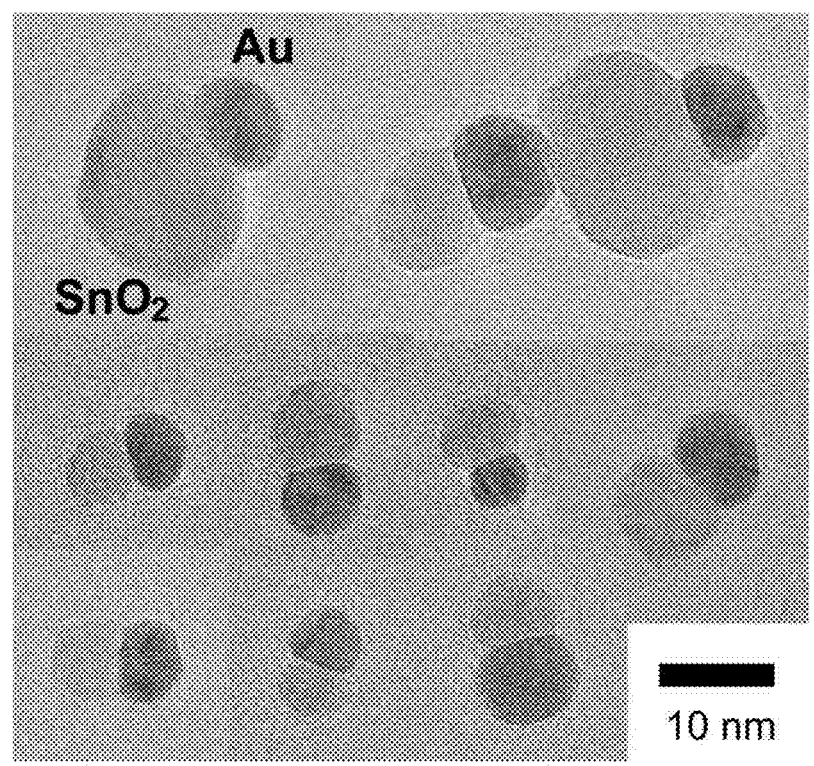
FIG. 6 is a TEM micrograph of Au—$SnO_2$ composite nanoparticles.

Formation of Au—$SnO_2$ Composite Nanoparticles, and Measurement of CO Oxidation Catalytic Activity Sn-5 at. % Au alloy nanoparticles (raw material) were obtained in helium gas by heating a Sn-50 at. % Au ingot at 1,180° C., by the inert gas evaporation method in the same manner as in Example 1. The alloy nanoparticles were subjected to a high temperature thermal oxidation at 700° C. for about 0.1 seconds in gas phase, to obtain Au—$SnO_2$ composite nanoparticles. Other experimental conditions were almost the same as in Example 1. FIG. 6 shows a TEM micrograph of the Au—$SnO_2$ composite nanoparticles. Analyzing the electron diffraction pattern, it was confirmed that the regions of lighter contrast were $SnO_2$ phase. Since there were so many peak positions of $SnO_2$ and Au in the diffraction pattern are overlapped with each other, peaks originating only from Au were impossible to separate. However, the regions of dark contrast are considered to be Au without Sn. The micrograph shows composite nanoparticles, in which one nanoparticle of Au and one nanoparticle of $SnO_2$ were combined by one interface.

Figure 7:
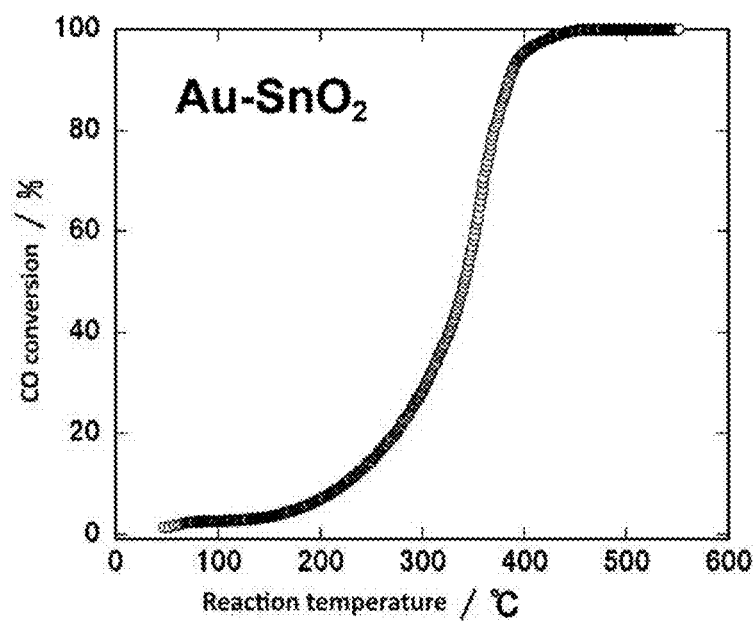
FIG. 7 is a diagram illustrating a catalytic activity (a temperature dependence of a conversion of CO to $CO_2$) of a sample containing Au—$SnO_2$ composite nanoparticles.

A sample for the catalytic activity measurement was obtained by collecting the composite nanoparticles together with a silica powder in the same manner as in Example 1. The total amount of the silica powder and the Au—$SnO_2$ composite nanoparticles (the content: 0.64 wt. %) used in the measurement was 50 mg. The temperature dependence of the conversion of CO to $CO_2$ was measured, in the same manner as in Example 1. FIG. 7 shows that the Au—$SnO_2$ composite nanoparticles also exhibited a catalytic activity for oxidation of CO. The conversion rapidly increased above 300° C., and $T_{50\%}$ was 345° C.

Example 3

Formation of Au—$Al_2O_3$ Composite Nanoparticles

As a source for generating alloy nanoparticles, use was made of a generation apparatus according to a laser ablation method. Helium gas was supplied at an inlet rate of 0.5 L/min into the apparatus, and the pressure inside the apparatus was maintained at a reduced pressure of 1.6 kPa using an oil rotary pump. A pellet (20 mmφ×5 mm t) of Al-5 at. % Au alloy was used as a raw material target, and the second harmonic of Nd:YAG laser (wavelength: 532 nm, output power: 90 mJ/pulse, repetition frequency: 10 Hz) was concentrated and irradiated on the surface of the pellet, to instantaneously evaporate the target surface. Thus, aggregates of nanoparticles of the alloy were generated in helium gas. The thus-generated alloy nanoparticle aggregates moved with a helium gas stream through a preheating mechanism, followed by sintering into isolatedly dispersed particles. The particles were then transported into a quartz tube heated to 900° C., together with oxygen gas at an inlet rate of 0.25 L/min, followed by subjecting to a high temperature oxidation treatment. The time period for the thermal oxidation treatment was about 0.01 seconds. The Au—$Al_2O_3$ composite nanoparticles formed by the oxidation treatment were naturally deposited sparsely on an amorphous carbon film settled inside the collector, to give a sample for electron microscopy observations.

Figure 8:
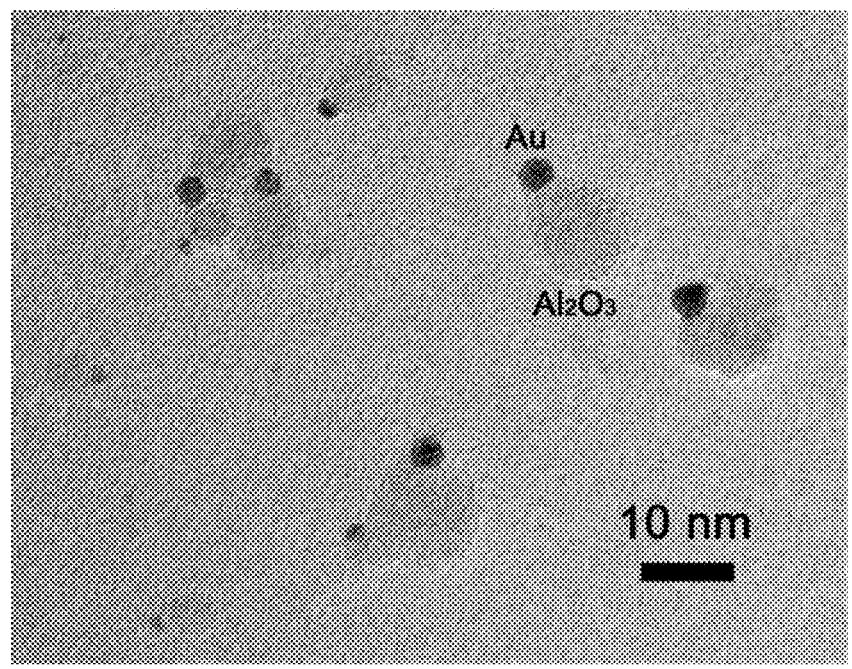
FIG. 8 is a TEM micrograph of Au—$Al_2O_3$ composite nanoparticles.

FIG. 8 shows a TEM micrograph of the Au—$Al_2O_3$ composite nanoparticles. As shown in the micrograph, individual particles exhibit a morphology in which a small dark contrast region is joined with a large light contrast region. Analyzing the electron diffraction pattern, the Al oxide constituted the particles was γ-$Al_2O_3$ phase. Thus, the region of dark contrast in the particle is Au, while the region of light contrast is γ-$Al_2O_3$.

Example 4

Formation of Pt—$Cu_2O$ Composite Nanoparticles

Figure 9:
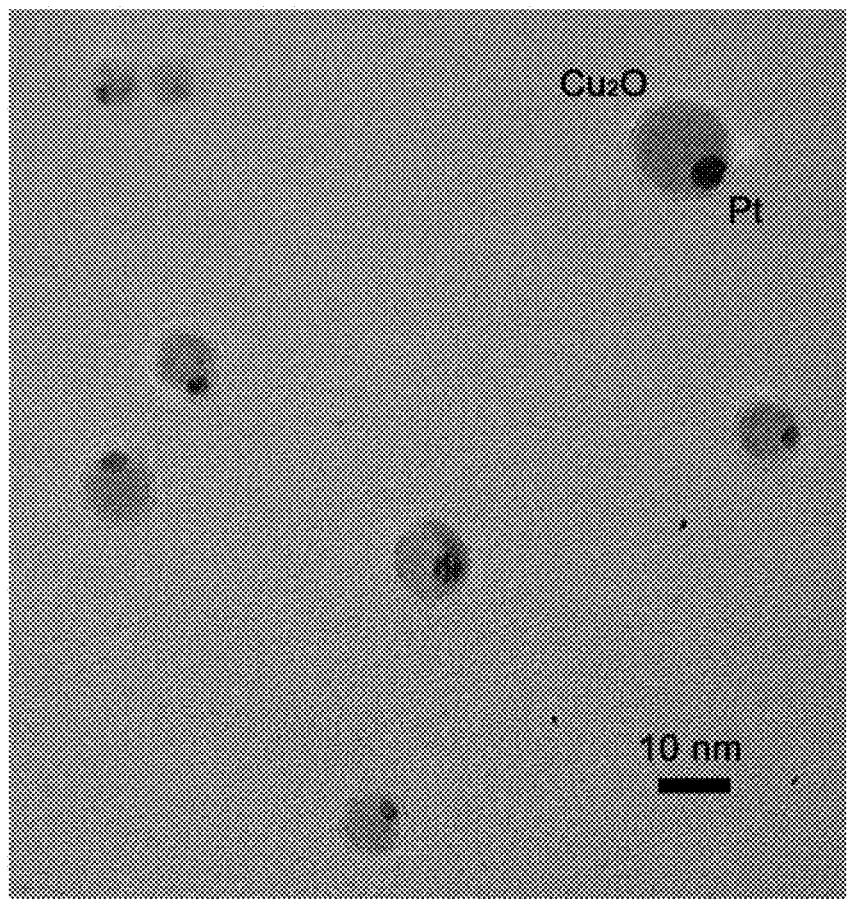
FIG. 9 is a TEM micrograph of Pt—$Cu_2O$ composite nanoparticles.

The experiment was carried out with a pellet of Cu-5 at. % Pt alloy as a raw material target, using a laser ablation method, in the same manner as in Example 3. A laser light was concentrated and irradiated to the target, to instantaneously evaporate the target surface. Thus, aggregates of nanoparticles of the alloy were generated in helium gas. The aggregates were sintered through a preheating mechanism, followed by transporting into a quartz tube heated to 900° C., together with oxygen gas, and subjecting to a high temperature oxidation treatment, to give Pt—$Cu_2O$ composite nanoparticles. The experimental conditions were the same as in Example 3. FIG. 9 shows a TEM micrograph of the Pt—$Cu_2O$ composite nanoparticles. As shown in the micrograph, individual particles exhibit a morphology in which a small dark contrast region is joined with a large light contrast region. Analyzing the electron diffraction pattern, the Cu oxide constituted the particles was $Cu_2O$ phase. Thus, the region of dark contrast in the particle is Pt, while the region of light contrast is $Cu_2O$.

Example 5

Formation of Pt—Al₂O₃ Composite Nanoparticles

Figure 10:
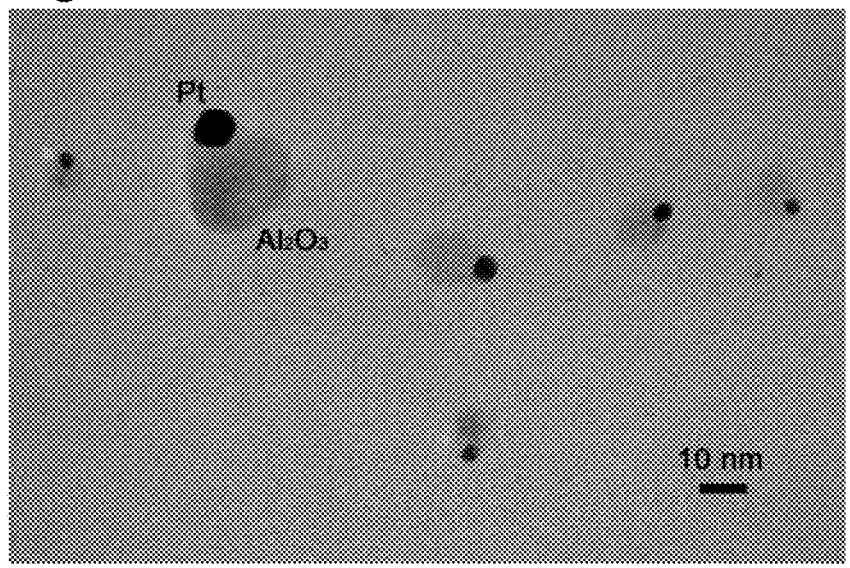
FIG. 10 is a TEM micrograph of Pt—$Al_2O_3$ composite nanoparticles.

The experiment was carried out with a pellet of Al-5 at. % Pt alloy as a raw material target, using a laser ablation method, in the same manner as in Example 3. A laser light was concentrated and irradiated to the target, to instantaneously evaporate the target surface. Thus, aggregates of nanoparticles of the alloy were generated in helium gas. The aggregates were sintered by a preheating mechanism, followed by transporting into a quartz tube heated to 900° C., together with oxygen gas, and subjecting to a high temperature oxidation treatment, to give Pt—Al₂O₃ composite nanoparticles. The experimental conditions were the same as in Example 3. FIG. 10 shows a TEM micrograph of the Pt—Al₂O₃ composite nanoparticles. As shown in the micrograph, individual particles exhibit a morphology in which a small dark contrast region is joined with a large light contrast region. Analyzing the electron diffraction pattern, the Al oxide constituted the particles was γ-Al₂O₃ phase. Thus, the region of dark contrast in the particle is Pt, while the region of light contrast is γ-Al₂O₃.

INDUSTRIAL APPLICABILITY

The present invention relates to a method of producing composite nanoparticles of a noble metal and an oxide, which is a method of forming heterojunction between two nanometer-scale phases. Furthermore, the present invention relates to composite nanoparticles of a high-purity noble metal and an oxide, in which the heterojunction is formed between two nanometer-scale phases. Thus, the nanometer-scale particles are to be given physical and chemical properties, such as chemical reactivity, electronic, magnetic and optical properties, which originate from the heterointerface between two phases having totally different properties. Thus, embodiments of the heterojoined noble metal-oxide composite nanoparticles according to the present invention are not limited to the catalyst applications in the Examples described above, and a quite wide variety of industrial applications thereof can be expected, by appropriately selecting the noble metal and the oxide.

The invention claimed is:

1. A method of producing a composite nanoparticle (M-A$_x$O$_y$), comprising:
generating, in an inert gas, an alloy (A-M) nanoparticle, which contains 0.1 at. % to 30 at. % of a noble metal (M), with the balance being a base metal (A) and inevitable impurities, and which has a particle size of 1 nm to 100 nm;
heating the alloy (A-M) nanoparticle and bringing the alloy (A-M) nanoparticle into contact with a supplied oxidizing gas during transportation of the alloy (A-M) nanoparticle with the inert gas;
oxidizing the base metal component (A) in the floating alloy (A-M) nanoparticle, and phase-separating into the thus-oxidized base metal component (A$_x$O$_y$) and the noble metal component (M), to thereby obtain a composite nanoparticle (M-A$_x$O$_y$) having one noble metal particle (M) combined to the surface of one base metal oxide (A$_x$O$_y$) particle,
wherein the one noble metal particle and the one base metal oxide particle are present at a 1:1 particle number ratio, and
wherein a thermal oxidation of the alloy (A-M) nanoparticle is carried out at a temperature of 400° C. or higher.

2. The method of producing a composite nanoparticle (M-A$_x$O$_y$) according to claim 1, wherein the composite nanoparticle (M-A$_x$O$_y$) is obtained in an independently dispersed state.

3. The method of producing a composite nanoparticle (M-A$_x$O$_y$) according to claim 1, wherein the thermal oxidation treatment of the alloy (A-M) nanoparticle is carried out in a gas phase, at a temperature of 400° C. or higher, for a treatment time period of 10 seconds or less.

4. The method of producing a composite nanoparticle (M-A$_x$O$_y$) according to claim 1, wherein the oxidizing gas is supplied before the heating of the alloy (A-M) nanoparticle, thereby heating it with a mixed gas of the oxidizing gas and the inert gas, or the oxidizing gas is supplied during the heating of the alloy (A-M) nanoparticle in the inert gas.

5. The method of producing a composite nanoparticle (M-A$_x$O$_y$) according to claim 1, wherein the generating of the alloy (A-M) nanoparticle is conducted by any one of an inert-gas evaporation method, a laser ablation method, a sputtering method, an arc plasma method, and an atmospheric pressure plasma method.

6. The method of producing a composite nanoparticle (M-A$_x$O$_y$) according to claim 1, wherein the base metal (A) of the base metal oxide (A$_x$O$_y$) component is one or more selected from Cu, Sn, Ti, V, Cr, Mn, Co, Fe, Ni, Zn, Al, Y, Zr, Mo, In, Mg, La, Ce, Nd, Sm, Eu, Gd, Si, Ge, Pb and Bi; and wherein the noble metal (M) is one or more selected from Au, Pt, Pd, Rh, Ag, Ru and Ir.

7. A method of producing a composite nanoparticle (M-A$_x$O$_y$), comprising:
generating, in an inert gas, an alloy (A-M) nanoparticle, which contains 0.1 at. % to 30 at. % of a noble metal (M), with the balance being a base metal (A) and inevitable impurities, and which has a particle size of 1 nm to 200 nm;
heating the alloy (A-M) nanoparticle and bringing the alloy (A-M) nanoparticle into contact with a supplied oxidizing gas during transportation of the alloy (A-M) nanoparticle with the inert gas;
oxidizing the base metal component (A) in the floating alloy (A-M) nanoparticle, and phase-separating into the thus-oxidized base metal component (A$_x$O$_y$) and the noble metal component (M), to thereby obtain a composite nanoparticle (M-A$_x$O$_y$) composed of a region of one base metal oxide (A$_x$O$_y$) particle and a region of one noble metal (M) particle,
wherein the one noble metal particle and the one base metal oxide particle are present at a 1:1 particle number ratio,
wherein a thermal oxidation of the alloy (A-M) nanoparticle is carried out at a temperature of 400° C. or higher,
wherein the base metal (A) is one or more selected from Cu, Sn, Al, Ni, Co, Ti, Zr, In, Si, La, Ce and Eu, and
wherein the noble metal (M) is one or more selected from Au, Pt, Pd, Rh and Ag.

8. A composite nanoparticle (M-A$_x$O$_y$), having one noble metal particle (M) with a particle size of 1 nm to 10 nm combined to the surface of one base metal oxide (A$_x$O$_y$) particle with a particle size of 1 nm to 100 nm, wherein the one noble metal particle and the one base metal oxide particle are present at a 1:1 particle number ratio,
wherein the base metal (A) of the base metal oxide (A$_x$O$_y$) component is one or more selected from the group consisting of Cu, Sn, Ti, V, Cr, Mn, Co, Ni, Zn, Al, Y, Zr, Mo, In, Mg, La, Ce, Nd, Sm, Eu, Gd, Si, Ge, Pb and Bi, provided that the case where the base metal oxide is ZnO or MnO is excluded, and wherein the noble metal (M) is one or more selected from the group consisting of Au, Pt, Pd, Rh, Ag, Ru and Ir.

9. The composite nanoparticle (M-$A_xO_y$) according to claim 8, wherein the composite nanoparticle (M-$A_xO_y$) is Au—$Cu_2O$ or Au—$SnO_2$.

10. A composite nanoparticle (M-$A_xO_y$), having a region of one base metal oxide ($A_xO_y$) particle, with a size of 1 nm to 200 nm and a region of one noble metal (M) particle with a size of 1 nm to 100 nm, wherein the one noble metal particle and the one base metal oxide particle are present at a 1:1 particle number ratio, wherein the base metal (A) of the base metal oxide ($A_xO_y$) component is one or more selected from the group consisting of Cu, Sn, Al, Ni, Co, Ti, Zr, In, Si, La, Ce and Eu, and wherein the noble metal (M) is one or more selected from the group consisting of Au, Pt, Pd, Rh and Ag.

11. The composite nanoparticle (M-$A_xO_y$) according to claim 10, wherein the base metal (A) of the base metal oxide ($A_xO_y$) component is one or more selected from the group consisting of Cu, Sn and Al, and wherein the noble metal (M) is one or more selected from the group consisting of Au and Pt.

* * * * *